United States Patent [19]

Magnotti et al.

[11] Patent Number: 5,751,811
[45] Date of Patent: May 12, 1998

[54] 32N +D BIT KEY ENCRYPTION-DECRYPTION SYSTEM USING CHAOS

[76] Inventors: Joseph C. Magnotti; Larry A. Nelson. both of 1909 S.E. 4th Ave., Fort Lauderdale, Fla. 33316

[21] Appl. No.: 756,047

[22] Filed: Nov. 26, 1996

Related U.S. Application Data

[63] Continuation-in-part of Ser. No. 521,522, Aug. 30, 1995, abandoned.

[51] Int. Cl.⁶ .................. H04L 9/28; H04L 9/00
[52] U.S. Cl. .................. 380/28; 44/42
[58] Field of Search .................. 380/28, 37, 44, 380/46, 42

[56] References Cited

U.S. PATENT DOCUMENTS

| | | | |
|---|---|---|---|
| 5,007,087 | 4/1991 | Bernstein | 380/47 |
| 5,048,086 | 9/1991 | Bianco | 380/28 |
| 5,291,555 | 3/1994 | Cuomo | 380/6 |
| 5,374,945 | 12/1994 | Molieri | 347/76 PH |
| 5,375,216 | 12/1994 | Moyer | 395/421 |
| 5,379,346 | 1/1995 | Pecora | 380/48 |
| 5,473,694 | 12/1995 | Carroll | 380/48 |
| 5,479,512 | 12/1995 | Weiss | 380/28 |
| 5,479,513 | 12/1995 | Protopopescu | 380/28 |
| 5,479,514 | 12/1995 | Klonowski | 380/47 |

Primary Examiner—Thomas H. Tarcza
Assistant Examiner—Carmen D. White
Attorney, Agent, or Firm—Malin, Haley, DiMaggio & Crosby, P.A.

[57] ABSTRACT

A cryptographic method and system based on chaos theory is provided. Unique random 64-bit binary strings generated from an iterative chaotic equation are used as logic and arithmetic operands during encryption/decryption. The random 64-bit binary strings are generated based on 4 initializer values that produce thousands of iterated values from the chaotic equation $z_{t+1}=Z_t^2+c$, where z and c are complex numbers. The 64-bit random numbers are translated into two 32-bit keys so that each 32 bits of message are encrypted/decrypted, using a bitwise logic operator such as an exclusive-or, with a unique 32-bit key for the length of the message file. For additional security, a combination of logic and arithmetic operators are used on the 32-bit keys and the 32-bit blocks of message text to produce 32N-bit blocks of ciphertext, where $N=2_r$ and $r \leq 2$. For any set of 4 initializer values, the lifetime, n, is the number of iterations of the equation $Z_{t+1}=z_t^2+c$ before divergence of the output to infinity, and the number of unique 32-bit keys is 4n, where n can be over 300,000 for a multitude of initializer values.

37 Claims, 4 Drawing Sheets

5,751,811

32N +D BIT KEY ENCRYPTION-DECRYPTION SYSTEM USING CHAOS

This is a continuation-in-part of Application No. 08/521, 522, filed Aug. 30, 1995, now abandoned.

BACKGROUND OF THE INVENTION

1. Field of the Invention

This invention relates to cryptography, and more particularly an encryption-decryption system and method using a 32N bit key generated from random numbers based on chaotic dynamics.

2. Description of Related Art

As the world becomes increasingly dependent on computers and data transmission, vast amounts of communicated data need to be secure from unauthorized access. Cryptography concerns the secure transmission of information by transformation of the intended message into a form only understood by the intended recipient.

Plaintext messages (M) are transformed into cryptograms or ciphertext (C) by utilization of a cryptographic algorithm, i.e., a set of rules or steps encompassing enciphering (T) and deciphering (D), and a set of cryptographic keys (K).

The encrypted ciphertext can be represented as:

$$C = T(M, K_e)$$

The recipient of the ciphertext can recover the plaintext message by employing:

$$D(T(M, K_e), K_d) = D(C, K_d) = M$$

The deciphering algorithm is usually the same algorithm as the enciphering algorithm, but it may be performed in the reverse order, and can be designated as $D = T^{-1}$.

In asymmetric, or public-key, cryptography, one of the keys, usually the encryption key $K_e$, is made public and the other key, usually $K_d$, is kept private. In symmetric cryptography, $K_e = K_d = K$; and encryption-decryption become:

$$C = T(M, K)$$

and $$T^{-1}(C, K) = M$$

Cryptographic security depends on keeping the key, which both the sender and recipient must have, as secret. In addition, the key should not be capable of being deduced by cryptanalysis. Techniques to prevent cryptanalysis include iterated cryptosystems, such as the Data Encryption Standard (DES) developed by IBM and accepted by the National Bureau of Standards in 1977, and the so called "one time pad" cryptosystem. (Systems for secure public-key cryptosystems include the Rivest, Shamir, Adleman (RSA) system).

The one time pad is the only truly unbreakable cryptosystem. The one time pad utilizes a randomly selected key equal or greater in length to the plaintext to be enciphered, and the key is used only once. For example, the bit stream of the plaintext message M is combined with the unique and random key K by using a suitable algorithm T, such as an exclusive-or function (XOR=⊕); or $$C = T(M, K) = M \oplus K$$

and, to decipher $$M = C \oplus K$$

Because K is random and used only once, the probability of decrypting C without knowledge of K, is essentially zero.

The problem with such a system is the intended recipient of the transmitted ciphertext must receive a secure key of equal length to the plaintext, and receive a new key for each message. A one time pad system may be acceptable for the transmission of top secret government messages, but not for large quantities of data.

Fortunately, construction of an unbreakable code is unnecessary to achieve effective data security. What is necessary, is the work involved to break the code be so great that the time, effort, and money expended is greater than the possible reward for success.

To achieve an acceptable level of security, while simultaneously reducing the nightmare of distributing the key to the intended recipient, a method of generating a truly random sequence based on a small set of initial conditions is needed.

Random number generators today produce pseudo random sequences which are useful for cryptography only if they are sufficiently random and they are secure. To be secure, an attacker should not be able to determine future values of the sequence based on past values, nor be able to determine the initial values based on the corresponding sequences produced. To be random, the sequences should be noise-like and aperiodic or nonrepeating.

To arrive at secure random generation, attempts have been made to utilize algorithms from the branch of mathematics known as is chaos. Using chaotic dynamics, periodic sequences can be utilized that have such long cycle times that they appear aperiodic in a region of interest. In other words, when operating in a chaotic region, a periodic sequence can be produced with cycle length approaching infinity. This is important to prevent an attack based on information contained in the periodicity. Likewise, initial values used to produce unique chaotic sequences should not be determinable from the sequences themselves.

A cryptographic technique based on chaos theory is presented in U.S. Pat. No. 5,048,086 to Bianco et al. (Bianco), the disclosure of which is incorporated herein by reference. Bianco used the logistic difference equation: $X_{n+1} = \mu x_n (1-x_n)$, to produce random sequences that appear aperiodic. The logistic difference equation is a nonlinear function that is chaotic for certain values of $\mu$, which is a constant between 0.0 and 4.0, and was selected to be between 3.57 and 4.0. The unique sequences produced by selection of an initial $x_n$, selected between 0.0 and 1.0, are very sensitive to small changes in the initial value of $x_n$. In other words, there is very little correlation between a small change in initial conditions and the output produced by that initial condition. (Bianco at col. 3, lines 24–54).

Bianco filtered the real number output of the logistic function, which is between 0.0 and 1.0, by limiting it between a preselected upper and lower limit, and converting the result to binary 1's and 0's. Numbers falling between the lower limit and a preselected midrange became 0's, and numbers between the upper limit and the midrange became 1's. (Bianco at col. 4, lines 20–48). The binary sequence was then added modulo-2 to the plaintext message, bit by bit, to arrive at the ciphertext. (Bianco at col. 5, lines 12–22). Modulo-2 addition is equivalent to the exclusive-or (XOR) function mentioned above, and; $C=M\oplus K$, where K=the binary sequence $(b_1, b_2, b_3 \ldots, b_n)$ created from the logistic function above.

The key used by Bianco to generate the binary sequence is the parameter µ, the upper limit, the lower limit, and an initialization count that determines the number of iterations the program will make before picking an initial starting point. (Bianco at col. 5, lines 5–7). According to Bianco, the actual values of the binary bit stream ($x_n$'s) are not obtainable from the filtered data, therefore, it would be computationally infeasible to recover the message or key from the ciphertext. (Bianco at col. 4, lines 33–48).

If one could obtain the binary sequence, only a bitwise manipulation (XOR) of the data and ciphertext would be required to arrive at the message: $M=C\oplus(b_1, b_2, b_3, \ldots, b_n)$.

Another cryptographic algorithm based on chaos theory is presented in U.S. Pat. No. 5,479,513 to Protopopescu et al. (Proto), the disclosure of which is incorporated herein by reference.

Proto utilized two chaotic functions: the same logistic difference function as utilized by Bianco: $x_{n+1}=\lambda x_n(1-x_n)$, where $\lambda \equiv \mu$; and the Bernoulli shift: $X_{n+1}=2x_n \mod 1$. These two functions are initialized using a key consisting of two 64 bit floating point "seeds" ($K_1$ and $K_2$), a 64 bit floating point X in the range of (3.99, 4), and an 8 bit integer (1) (small L) representing the number of iterations between subsequent values in the pseudo random sequence. (Proto at col. 5, lines 35–62).

The initial seed values $K_1$ and $K_2$, and λ are plugged into the chaotic functions above and the functions are iterated 1 time to produce the first iterate values $C_1^{(1)}(K_1)$ and $C_2^{(1)}(K_2)$. The first iterates are XORed together to produce a first value $R_1$. $R_1$ is a 64 bit XORed product and the byte (8 bits) consisting of bits 48–55 are extracted forming a pseudo random integer value $P_1$. (Proto at cols. 5, lines 63–67; col. 6, lines 1–9).

The chaotic functions are then iterated again producing second iterate values which are XORed together to form second value $R_2$. Bits 48–55 are extracted from $R_2$ to form $P_2$. This process continues until pseudo random integer sequence $P_1, P_2, \ldots, p_n$ is formed. (Proto at col. 6, lines 10–29).

The pseudo random integer sequence is then XORed with the plaintext message to generate the ciphertext. The plaintext message is first separated into 8 bit component characters $m_n$, such as ASCII representation, to be XORed with the 8 bit pseudo random integers $P_n$. The ciphertext components $C_n=M_n\oplus p_n$. To decipher, $m_n=c_n\oplus p_n$. (Proto at col. 5, lines 20–28; col. 6, lines 30–40).

Like Bianco, anyone able to reach the pseudo random integer sequence can perform a bitwise manipulation (XOR) to arrive at the plaintext message.

SUMMARY OF THE INVENTION

The present invention is a cryptographic system utilizing a key based on chaotic dynamics. The chaotic dynamic behavior utilized in the present invention is based on the equation studied by mathematician Benoit Mandelbrot:

$$z_{i+1}=z_i^2+c \quad (1)$$

where z and c are elements of the set of complex numbers: (z,c) C C, such that $z_0=a+b(-1)^{1/2}$ and $c=q+p(-1)^{1/2}$ for $-1 \le (a,b,q,p) \le 1$.

Using a Cartesian grid, where the y-axis forms the imaginary axis and the x-axis forms the real axis, Mandelbrot plotted the points, c, for $z_0=0$ that did not diverge to infinity after several iterations, i.e., the Mandelbrot Set. For non-zero values of c, or for certain non-zero values of constants, p and q, in the equation; $c=q+pi$, where i is the square root of −1, there exist points, $z_0=a+bi$, that diverge to infinity only after a large, finite number of iterations of equation (1).

True chaotic systems are nonrepeating. Examples of this occur in natural chaotic systems such as fingerprints, snowflakes, leaves of a tree, etc.. Unless an iterative mathematical system eventually diverges to infinity, and the number of iterations that are necessary to achieve divergence is observed, we are bound to conclude that the system is not truly chaotic, but that it is yielding to a repeating series of values, though the series may be too numerous to measure. The only way to be certain that a system is truly chaotic is to measure its lifetime.

Definition:

Let $Z_{t+1}=Z_t^2+c$, where $z_0=a+bi$ and $c=p+qi$ for real numbers a, b, p, q and for $i=\sqrt{-1}$. For any c in this equation starting at some initial $z_0$, the number of iterations, n, required for $z_{t+1}$ to explode to infinity is defined as the lifetime of c at $z_0$.

For any input, ($z_0$, c) , equation (1) will produce a series of output points, zt, such that $-1 \le Z_t \le 1$, up until the last 10 iterations, (n−10), when the output abruptly diverges.

The mathematical system described herein is extremely sensitive to initial conditions. For instance, two initial inputs that differ by a magnitude of 0.0000000001 are just as likely to yield widely different outputs as two inputs that differ by 0.01, for a certain number of iterations. Conversely, it is just as probable for two initial inputs differing by 0.01 to yield similar outputs, while two that differ by 0.0000000001 will diverge widely after a certain number of iterations.

Therefore, knowing that a given initial input, ($z_0$, c), in equation (1) diverges to infinity after n iterations and that each $Z_t$ is unique, equation (1) is chaotic and yields n unique numbers which can be used as a key generator for the binary encryption system of then present invention.

The general form for a cryptosystem can be written $\chi=<<K, M, C, T>>$, where K is the keys space, M is the message space, C is the encrypted message space (ciphertext), and T is the transformation function, T(k,m), such that each restriction $t_k(m): M\to C$ defined by T(k,m) has an inverse $t_k^{-1}: C\to M$. The message space consists of the alphabet, {0,1}, i.e., the messages are binary bit-strings.

For a cryptosystem to be successful, the key space must, in addition to the requirements mentioned above, have cardinality large enough for an exhaustive key search to be computationally infeasible. These requirements are met by a unique application of equation (1) as a random number generator, with the encryption being a bitwise exclusive-or operation between these keys and the message space. For the message space based on the binary alphabet {0,1}, the exclusive-or (XOR=$\oplus$) operator is defined as: $1\oplus 1=0$, $1\oplus 0=1$, $0\oplus 1=1$, and $0\oplus 0=0$.

In an alternate and preferred embodiment, the encryption algorithm incorporates a bitwise XOR operation and at least one arithmetic operation between the key space and the message space.

Accordingly, it is an objective of the present invention to produce random numbers, based on chaos theory, to generate keys for use in a cryptographic system.

It is another objective of the present invention to provide a cryptographic system based on chaos theory that is sensitive to initial conditions and, prior to approaching infinity, produces an output of n unique numbers, for a given initial input.

It is still a further objective of the present invention to provide a cryptographic system that utilizes a logic and at least one arithmetic operation between the message space and the key space.

It is yet a further objective of the present invention to provide a cryptographic method that operates quickly and efficiently, in less time than either DES or RSA, and is just as secure.

It is still a further objective of the present invention to provide a cryptographic system that can be written in any computer language and operates on any computer, microprocessor, processor chip, or any other electrical device.

In accordance with these and other objects which will become apparent hereinafter, the instant invention will now be described with particular reference to the accompanying drawings.

DESCRIPTION OF THE PREFERRED EMBODIMENTS

Figure 1:
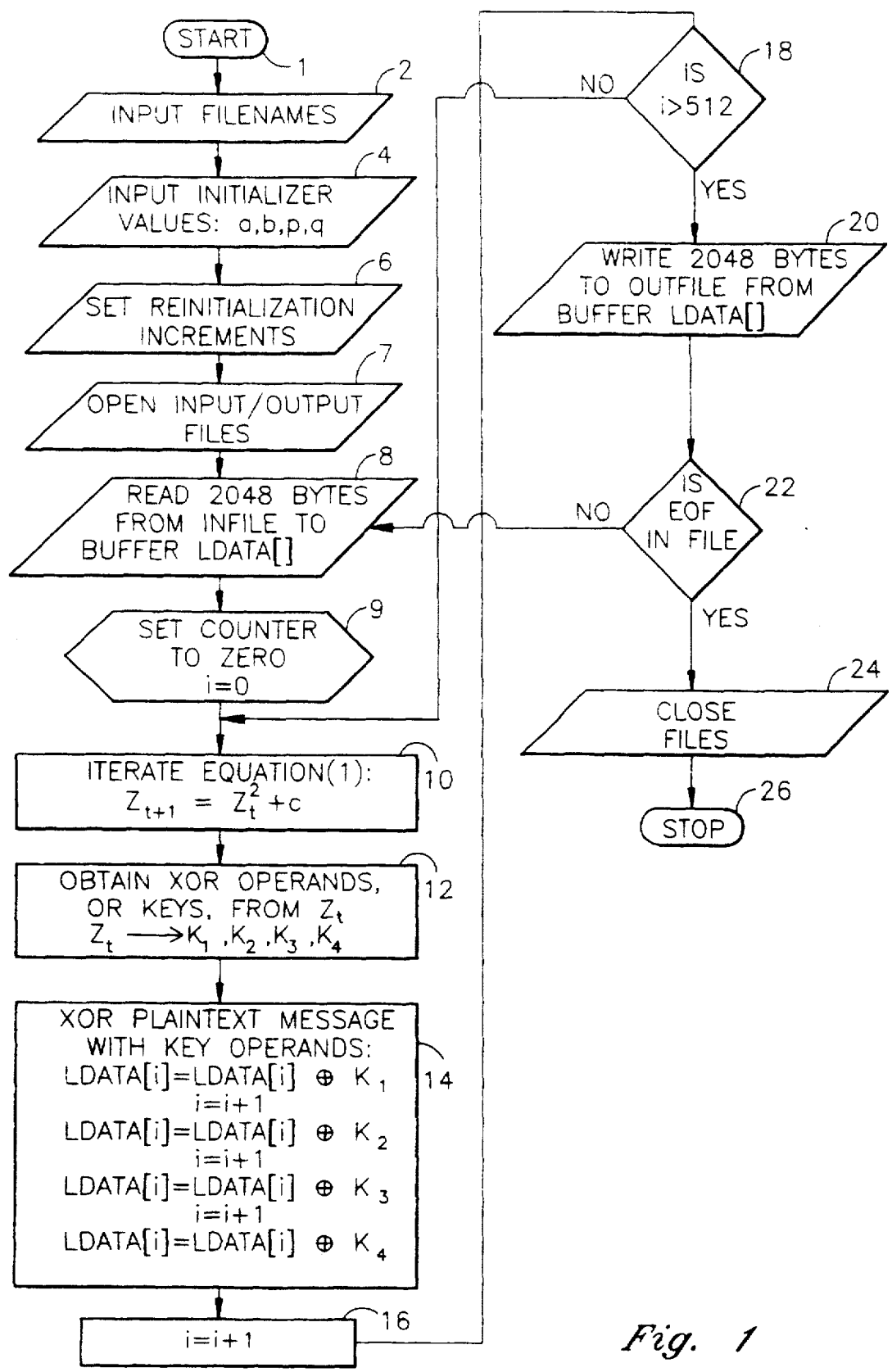
FIG. 1 is a flow diagram of the method and apparatus of the cryptographic system of present invention.

Referring to Table I, the following equation:

$$z_{t+1} = z_t^2 + c \qquad (1)$$

where z and c are elements of the set of complex numbers: $(z,c) \subseteq C$, such that $z_0 = a + b(-1)^{1/2}$ and $c = q + p(-1)^{1/2}$ for $-1 \leq (a,b,q,p) \leq 1$, was iterated using various initial points, $(z_0, c)$, to identify points exhibiting long lifetimes. For any pair, $(z_0, c)$, so identified, the number of permutations for that pair, leaving c and the first two digits of $z_0$ constant, was in the order of $\sim 10^{26}$.

Each number $z_0$ consists of two parts z.x and z.y, where z.x ≡ a, z.y ≡ b, and each of which is limited in length by the software used to implement the invention, or 15 digits long in the examples described herein. Likewise, the number c consists of two parts a.x ≡ q and a.y ≡ p. Table I shows the four numbers a.x, a.y, z.x, and z.y, and the associated lifetimes before equation (1) exploded to infinity for that set of numbers. These four numbers, a.x, a.y, z.x, and z.y, represent the key, and the lifetime, n, represents the number of unique iterations, zr's, generated by that key. The unique Zt's are used to generate the key space K.

The cryptosystem of the present invention:

$$\chi_{32} = <<K_{32}, M_{32}, M'_{32}, T_{32}>> \qquad (2)$$

where $$M_{32}, M'_{32} = \{m_j | m_j = b_0 b_1 b_2 \ldots b_{32}\}$$

and $$b_i \in \{0,1\}$$

is herein described. The message space and ciphertext space are each broken into 32-bit strings. The numbers $z_t$ generated from equation (1) are in the form of two 64-bit double floating point values. The 64-bit double floating point numbers are translated into four 32-bit integer numbers: $f(z_t) = (ka_t, kb_t, kc_t, kd_t)$ and then used in the transformation function. The transformation function is the exclusive-or (XOR) bitwise operator ($\oplus$) and encrypts/decrypts 32-bit blocks of message into 32-bit blocks of ciphertext or visa-versa, per transformation.

The key space is the set of all 32-bit strings: $T(k,m) = k \oplus m = m'$. Decryption is simply repeating the XOR operation with the cipher text and key stream: $t_k^{-1} = k \oplus m' = m$. The algorithm encrypts up to 16n bytes of message, where n is the lifetime of c at $z_0$, with a unique string for each 4 bytes of message. If the lifetime n is reached, the algorithm is reinitialized with a new set of numbers, as discussed below.

TABLE I

Selected Initializer Points

| c (a·x) | c (a·y) | z·x | z·y | Lifetime |
|---|---|---|---|---|
| −0.699 | .256405026768929 | 0.79 | 0.05 | 35845 |
| −0.599 | .422159492989359 | −0.43 | 0.29 | 17854 |
| −0.5 | .601599099448910 | −0.13 | 0.24 | 42321 |
| −0.499999 | .601599099448910 | −0.092 | 0.851 | 377147 |
| −0.499999 | .601599099448910 | −0.86 | 0.37 | 195518 |
| −0.499998 | .601599099448910 | −0.50 | 0.04 | 153769 |
| −0.499998 | .6016 | −0.24 | 0.24 | 177323 |
| 0.3 | .571054493919800 | 0.11 | 0.58 | 13021 |
| −0.25 | .636146097147997 | −0.91 | 0.46 | 64358 |
| −0.25 | .636146 | −0.26 | 0.08 | 61100 |
| −0.249998 | .636146097147997 | −0.25 | 0.28 | 95014 |
| −0.10 | .878039800605091 | 0.01 | 0.07 | 15478 |

Using an IBM compatable personal computer, with an Intel 80486 DX2 50 Mhz microprocessor, an example of a software implementation of the above 32N-bit cryptosystem was written in a C-language computer program. The following description of the present invention utilizes the C-language implementation of the present invention, called KCRYPT, as an example only to aid in understanding. By using KCRYPT as an example, the present invention is not intended to be limited to this particular computer program.

Referring now to FIG. 1, upon starting the system 1, the read/write, or input/output, computer files 2 and the initialization numbers, or seeds (a, b, p, q), 4 are entered, (via the keyboard in KCRYPT). KCRYPT first performs a check of entered data to minimize errors. The same information must be entered twice before the system proceeds.

The reinitialization increments 6, called inc1 and inc2 in the program KCRYPT, are arbitrarily set to some constant. If the message space exceeds the maximum bytes allowed by the lifetime of the key used, the generator will be reseeded with new initializers, as determined from the preset increments, and the encryption process continues with additional unique values, (z,s). The increment values can be made part of the key along with (a, b, p, q), or coded directly into the program. In KCRYPT inc1 and inc2 were set in code to =0.000000000000001.

After opening the input/output files, 7, up to 2048 bytes of plaintext message is read into a buffer, called 1data in KCRYPT, that can store 512 long integers 8. (A long integer in this system is 32 bits long) A counter is set 9, and the chaotic generator, equation (1): $z_{t+1} = z_t^2 + c$, is iterated 10. The two floating point outputs of equation (1) are 64 bits long and are converted into four long integer values ($k_1$, $k_2$, $k_3$, $k_4$) 12. The conversion of the floats into integers is accomplished by using the first significant eight digits of the generator output, in decimal form, and multiplying this value times the maximum 4 byte integer value, or 2147483647. This process is repeated for the last seven significant digits of the generator output so that two long integer values are obtained for each of the two floating point values received from the generator.

The long integers are then XORed with the plaintext message data stored in the buffer 14, (1data). The counter is incremented 16, and the process continues for the entire 512 long integers 18 contained in the buffer 1data.

After the entire buffer (1data) of 512 long integers is XORed with the plaintext message, the entire 2048 bytes of ciphertext is written to the output file 20. If the end of the message is detected 22, the system closes the input/output files 24 and stops 26. If the end of the message is not detected 22, another 2048 bytes of plaintext message is read into the 1data buffer 8, and the process repeats until the end of the message file is reached.

Decryption is performed in the same manner with the plaintext message replaced with ciphertext, with the result being plaintext instead of ciphertext.

In operation, if a computer file or other digital information were being sent from one point to another, and security was an issue, the file or information would be entered along with the chosen initialization numbers and the destination file or output port. The intended receiver would enter the same initialization numbers, the file to be decrypted, and the location for the decrypted information.

From a cryptanalytical standpoint the above algorithm's only weakness would be against a brute force attack on the ciphertext itself. A brute force attack on the key would be against 2196 combinations, an attack on the ciphertext itself would only involve 232 combinations for each four bytes. In fact, an inherent weakness exists in all current private-key encryption schemes utilizing logical bit-wise operations, such as the XOR operation. Assuming the cryptanalyst was in possession of the algorithm, a sample of message text, and a sample of the related ciphertext, the actual encryption bit-stream could be obtained by simply XOR'ing the message and cipher texts: $m' \oplus m \rightarrow k_1, k_2, \ldots, k_j$. Any subsequent message using the same key would be compromised. Multiple encryptions, using either the algorithm previously described or any algorithm presently available that utilize bitwise logical operations for digital encryption, including the work of Bianco and Proto discussed above, does not increase the security of the cipher. Consecutive XOR operations do not increase the key bit-length or the complexity of the encryption, regardless of whether one is using unique numeric values from a pseudo-random number generator or any other source of key bit-stream.

The weakness of the above algorithms, which utilize bit-wise logical operations for encryption/decryption, led to an alternate embodiment of the present invention.

The alternate, and preferred, embodiment of the present invention is extremely secure and involves the addition of an arithmetic operation in the cryptographic algorithm used above.

The preferred embodiment of the cryptographic system of the present invention:

$$<<K_{(64+D)}, M_{32}, M'_{64}, T_{(64+D)}>>$$

is herein described. The quantity D is defined as: $2\log_2(10^d)$, where $d \leq 15$, 15 being the number of significant digits in each initializer key. The algorithm utilizes equation (1) as described herein above, and where:

$$z_i = A_0 + B_0 i \quad z_{i+1} = z_i^2 + c = A_i + B_i i \quad T(f(k), m_{32}) = t_k(m_{32}) = m_{64} = m'$$

where $$f(k) = (k_{i1}, k_{i2}, k_{i3}) \quad t_k(m): A_r \rightarrow (k_{i1}, k_{i2})$$

and $$B_r \rightarrow (k_{i4}, k_{i3}) \quad m_{32} * k_{i1} = m_{64} \quad m_{64} \rightarrow (L_r, R_r) \quad k_{i2} \oplus L_r = L'_r, k_{i3} \oplus R_r = R'_r$$
$$(L'_r, R'_r) \rightarrow m'_{64} = m'$$

The key $K_{r4}$ is then used to convert the next 32-bit string of message into a 64-bit string, which is split into two 32-bit parts, $L_{r+1}$ and $R_{r+1}$, with each part being XORed with $k_{(r+1)2}$ and $k_{(r+1)3}$ respectively, and so on.

Decryption is the reverse of the operation above:

$$T(f(k), m') = t_{k-1} = m$$

where $$t_k^{-1}: m' \rightarrow (L'_r, R'_r) \quad k_{i2} \oplus L'_r = L_r, k_{i3} \oplus R'_r = R_r, (L_r, R_r) \rightarrow m_{64} \quad m_{64} * (k_{i1})^{-1} = m_{32}$$

The message space consists of the set of all 32-bit binary strings as in the previous algorithm. However, the ciphertext space is the set of all 64-bit binary strings. Unlike the previous algorithm, a direct attack in this case will not yield the original message because there is not a one-to-one bit correspondence between the message and ciphertext. The encrypted message consists of two bytes for every one byte of message text. A brute force attack on the ciphertext must proceed against 64-bit blocks in combination with every possible d-digit integer number, or against every possible combination of $k_{r1}, k_{r2}$, and $k_{r3}$, in order to yield 4 bytes of message text. As $k_{r2}$ and $k_{r3}$ are 32 bit long integers, and $k_{r1}$ is a double floating point value up to 15 digits ($d \leq 15$), a cryptanalyst in possession of the algorithm, a sample of plaintext message, and related ciphertext would be dealing with an effective key bit length of:

$\log_2((2^{32})(2^{32})(10^d)) = 64 + D$, where $D = 2\log_2(10^d)$, for every 4 bytes of message text.

The cryptosystem defined by equation (2) and described above, utilizes a logical bit-wise XOR operation for each encryption/decryption. The cryptosystem defined by equation (3) utilizes one arithmetic operation, in addition to the XOR operator, per encryption/decryption. If r is defined as the number of arithmetic operations per encryption/decryption, it can be seen that both equations (2) and (3) are special cases, where r=0 and r=1 respectively, of the generalized cryptosystem:

$$<<K_{(32N+D)}, M_{32}, M'_{32N}, T_{(32N+D)}>> \qquad (4)$$

where $$N = 2^r$$

and $$D = 2r\log_2(10^d) \text{ for } d \leq 15$$

(The number of arithmetic operations per encryption/decryption is equivalent to the number of passes through the algorithm, or repetitions, i.e., multiple encryptions).

The key bit-length of the generalized cryptographic system of equation (4) is limited only by the significant digits of the initializer values. Beyond r=2 (or N=4, 32N=128, D≈90), there is no increase in the security of the system for multiple encryptions. If d is the maximum number of digits for each initializer, then the maximum key-bit length is given by the number of possible combinations of four, 15-digit numbers (each of which can be a positive or negative number):

$$log_2(2^{4 \times 10^{4d}})=4+4log_2(10^d) \qquad (5)$$

where, $2^4 \times 10^{4d}$=possible combinations of initializers.

(For four d-digit numbers:

| (a.x) | (a.y) | (z.x) | (z.y) | | |
|---|---|---|---|---|---|
| $(2 \times 10^d)$ | $\times (2 \times 10^d)$ | $\times (2 \times 10^d)$ | $\times (2 \times 10^d)$ | = | $2^4 \times 10^{4d}$. |

We know that $D=2rlog_2(10^d)$ and $32N=2^{(r+5)}$, so that for r>2 the terms of equation (5) are exceeded. Therefore, at the present time the algorithm is limited to a maximum of two arithmetic operations per encryption/decryption. For the instant case, the possible combinations of four 15-digit floating point numbers is $2^4 \times 10^{60}$ so that d=15 and the maximum effective key bit-length computed from (5) is 196.

An example of a software implementation of the preferred embodiment of the cryptosystem of the present invention, as defined by equation (3), and equation (4) with r=1, was written in a C-language computer program called KCRYPT2. The discussion herein above with regards to limiting the present invention to a single C-language computer program implementation, KCRYPT, is herein reiterated for the preferred embodiment of the present invention, and computer program KCRYPT2.

Figure 2A:
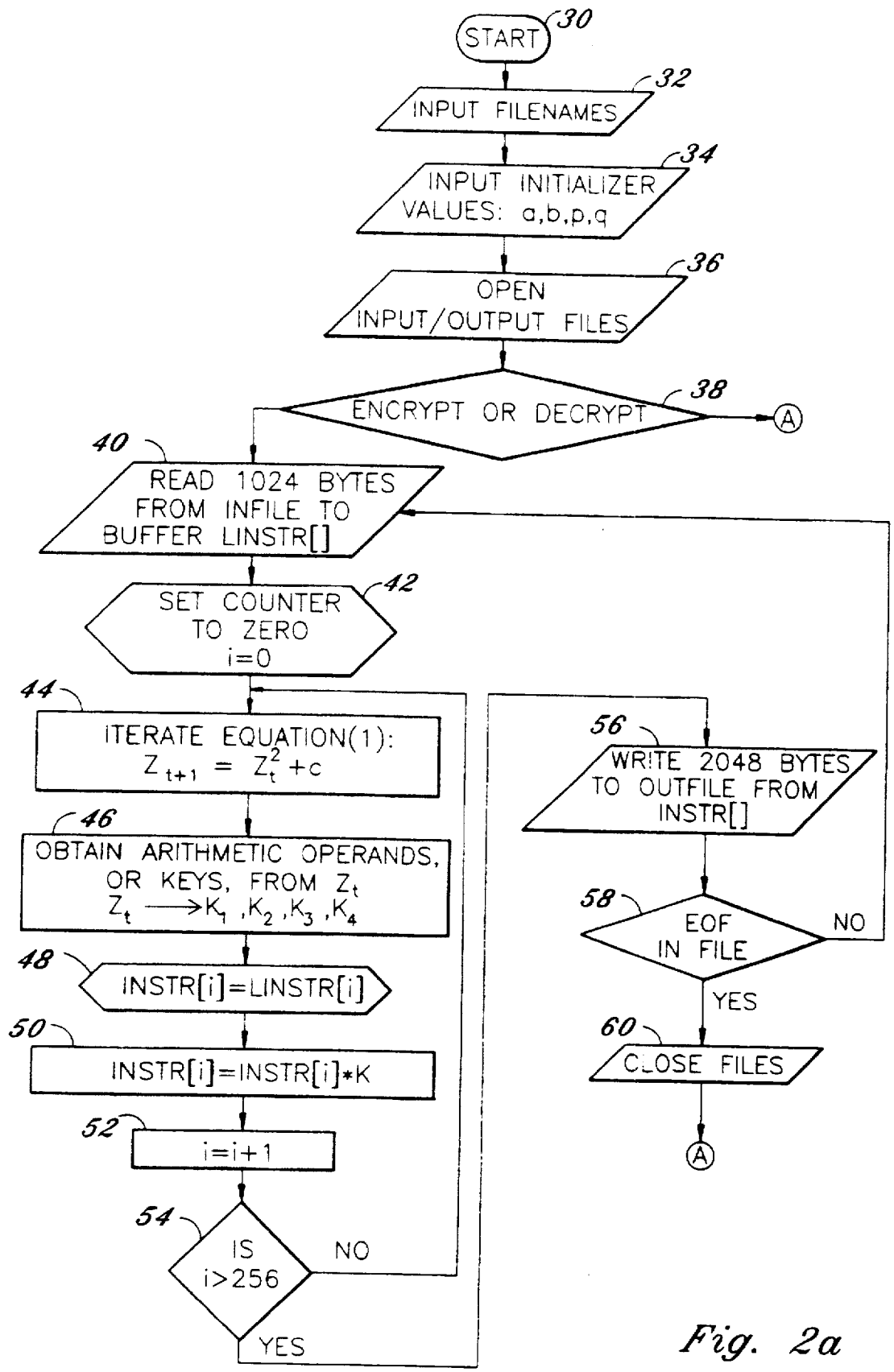
FIGS. 2a–2c is a flow diagram of the method and apparatus of an alternate embodiment of the cryptographic system of the present invention.
Figure 2B:
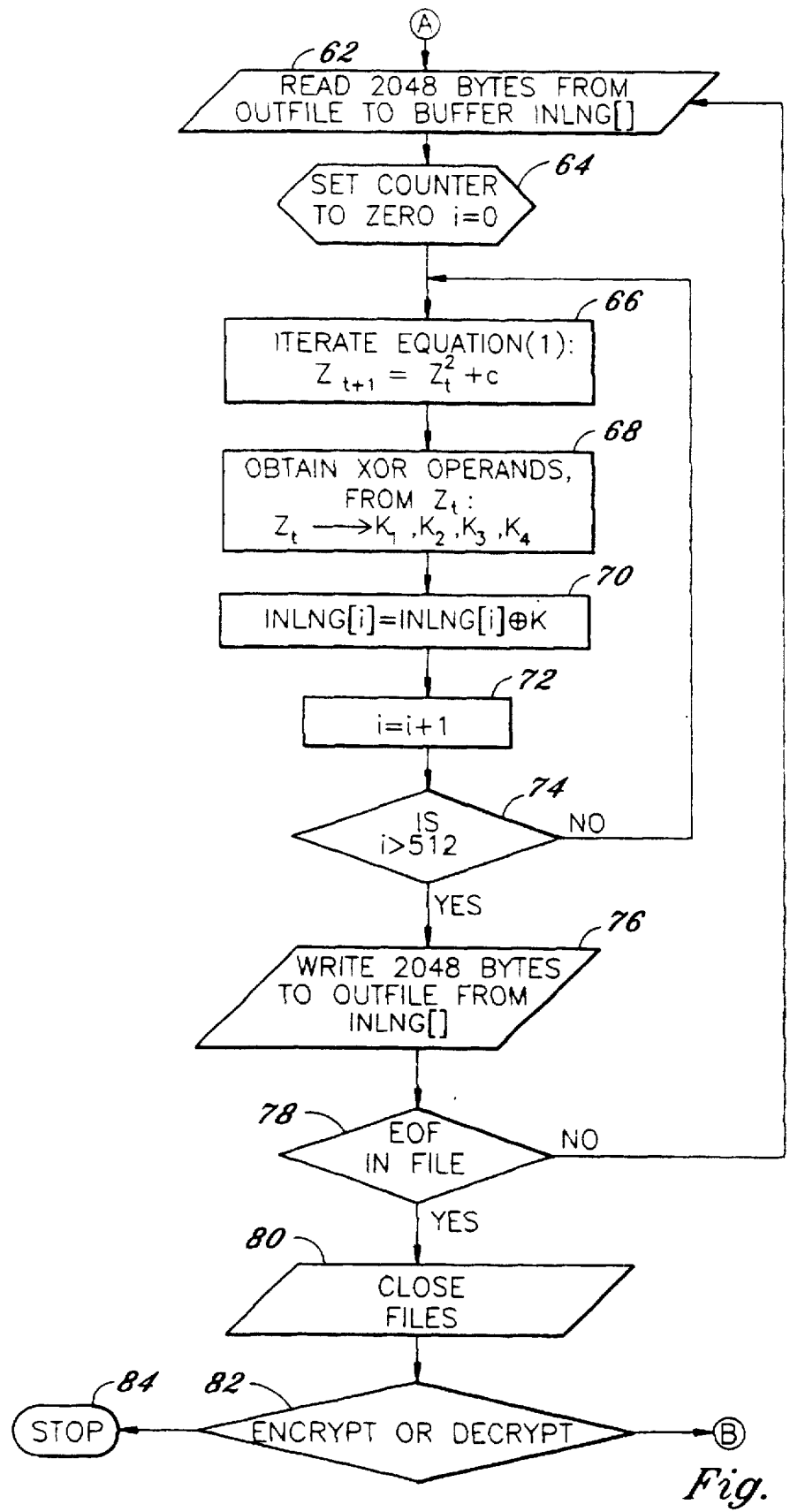
Figure 2C:
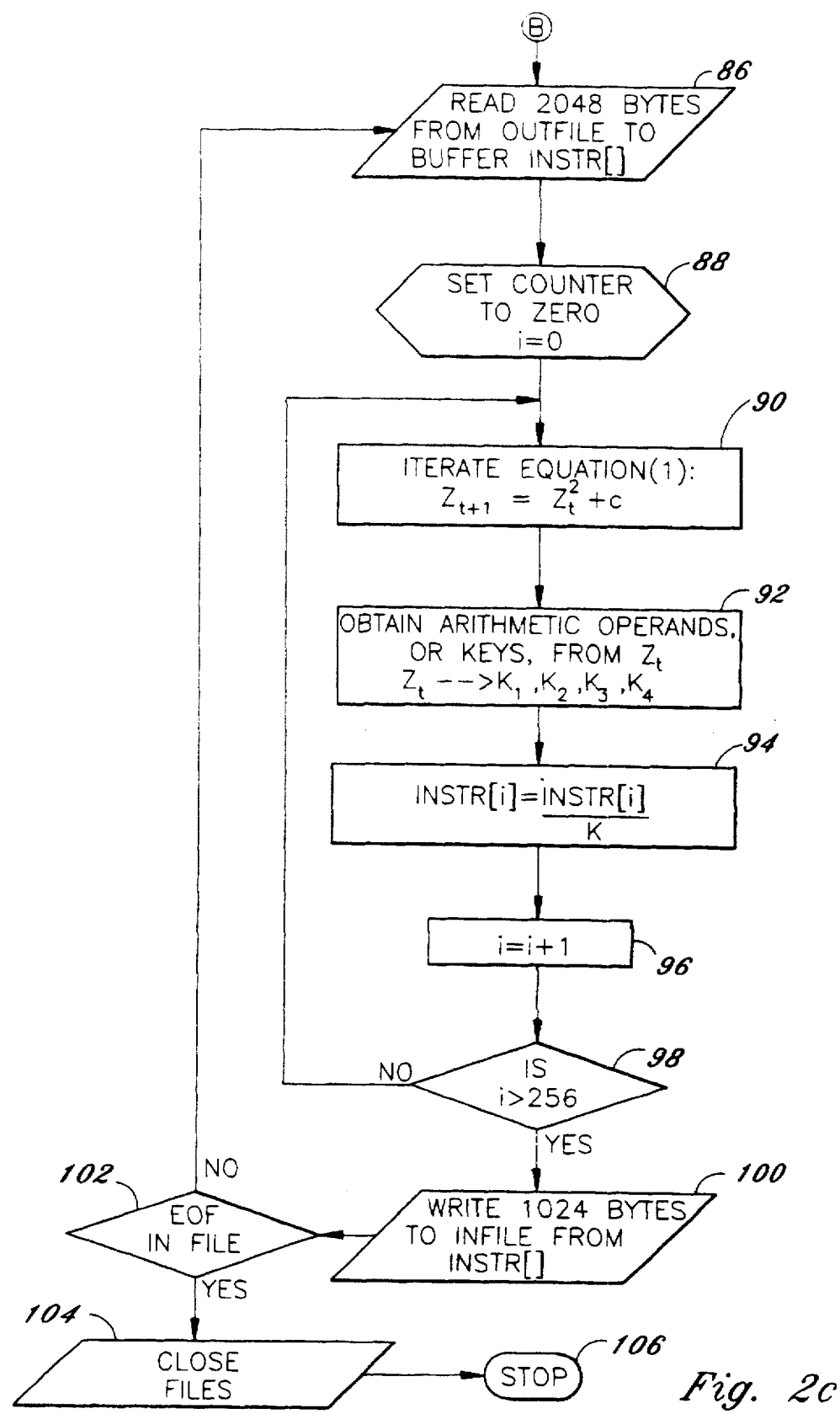

Referring now to FIGS. 2a–2c, upon system start up 30, the input/output file names 32, the initializer values (a, b, p, q) 34, and mode (encrypt/decrypt) 38 are entered, (via keyboard in KCRYPT2). For the encryption mode 38, the plaintext message is read from the input file, (function encrypt( ) in program KCRYPT2), and put into a long (32-bit) integer buffer, called linstr in KCRYPT2, of the length of the file up to 1024 bytes 40. A counter is set 42, and the chaotic generator, equation (1): $z_{t+1}=z_t^2+c$, is iterated 44. The arithmetic operands ($k_1$, $k_2$, $k_3$, $k_4$) are obtained from equation (1) 46.

Each long integer in buffer linstr is then converted to a floating point number (64 bits) 48 and then multiplied by a 6 digit number 50 obtained by using the first 6 digits of each output, $z_t$, of equation (1) 46. The accuracy of the floating point data type is limited to 15 significant digits, by using the first 6 digits of each $z_t$ ensures that the result of the multiplication does not exceed this significant limit.

The counter is then iterated 52 and this process continues until 256 long integers in the input buffer are multiplied by the key values 54.

The result of each multiplication is then written to an output file as a 64-bit floating point value 56. If the end of the message (end of file) is not detected 58, another 1024 bytes is read into the input buffer linstr 40, and the process repeats. If an end of message is detected 58, the files are closed 60, and the output file containing the 64 bit floating point values is read into a long integer buffer (called inlng in KCRYPT2) 62, of the length of the data file up to 2048 bytes. The effectively separates each 64 bit floating point value into two 32 bit halves. This is accomplished by function XOR( ) in KCRYPT2.

As above, a counter is set 64, and the chaotic generator, equation (1) : $z_{t+1}=z_t^2+c$, is iterated 66. The XOR operands ($k_1$, $k_2$, $k_3$, $k_4$) are now obtained from equation (1) 68.

The XOR operands ($k_n$s) are obtained by multiplying the last 9 digits of each Zt times the value of the maximum long integer value type 68. The result is XORed with each 32-bit long integer in the 2048 buffer, inlng, 70. The counter is incremented 72, and the process continues until all 512 long integers in the buffer (inlng) have been XORed with the XOR keys.

The result is written back into the output file, which is now ciphertext of 64 bit floating point length words 76. If an end of file is detected 78 the files are closed 80, and for encryption 82 the system stops 84. If an end of file is not detected 78, the next 2048 bytes are read into the input buffer inlng 62, and the process continues.

In the decryption mode 38, the process is reversed. First, data (ciphertext) is read from the output file (which is the input file for decryption) (this is accomplished by function XOR( ) in KCRYPT2) into a long integer buffer (inlng) of the length of the file up to 2048 bytes 62. The operation described above for encryption is then performed on each 32-bit value, and the result is written back to the output file (input file).

Data is then read from the output file (input) (by the function decrypt( ) in KCRYPT2) into a double floating point buffer 86, called instr in KCRYPT2.

As in encryption, a counter is set 88, and the chaotic generator, equation (1) $Z_{t+1}=z_t^2+c$, is iterated 90. The arithmetic operands ($k_1$, $k_2$, $k_3$, $k_4$) are obtained from equation (1) 92. But instead of multiplying for encryption 50, each 64-bit value is divided by the 6 digit number obtained from the $z_t$ output of equation (1) 94. The counter is then incremented 96, and the process continues for each of 256 values in the floating point buffer, instr 98.

The result, 1024 bytes, is written as 32-bit long integers to the input file, (the output file for decryption), 100, which is now the plaintext message. If an end of file is not detected 102, another 2048 bytes is read from the output file (input file for decryption) to buffer instr 86, and the process repeats. If an end of file is detected 102, the files are closed 104, and the system stops 106.

With a slight modification of the algorithm, any multiple of 196 bit keys can be input and used with the algorithm to increase the security of the system. Key bit lengths are possible of 392 bits, 588 bits, 784 bits, 980 bits, 1176 bits, 1372 bits, 1568 bits, 1764 bits, 1960 bits, 2156 bits, 2352 bits, and so on limited only by available memory. These key sets would in turn be used in series as inputs to equation (1) above. The output would then be used to encrypt/decrypt the data, and be stored in memory for use as the next input of equation (1). The increase of key bit length, and hence security, by using multiple sets of keys, does not noticeably slow down the algorithm. The time required to encrypt a one megabyte file (1,024,000 bytes), using a 2352 bit key, was benchmarked at 5.376228 seconds per megabyte, using a 80486 DX2 50 Mhz microprocessor.

Alternately, some or all of the initializer values (a, b, p, q) can be hard-coded on an Erasable Programmable Read Only Memory (EPROM) chip and incorporated into a "smart card" for portability, or encoded on a magnetic tape strip, bar code, or similar device known in the art. The cardholder could then obtain access to encrypted information by using the card in combination with manual input for any remaining initializer values for the particular set of initializers used to encrypt the information.

In another embodiment, the initializer values and the KCRYPT2 program could both be encoded in a microprocessor chip to provide for instant encryption/decryption of digital telecommunications.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of encryption comprising the steps of:
  a) selecting four initializer values which are used to generate n chaotic iterates from a chaotic equation, where n is the lifetime of the chaotic equation, and wherein said chaotic equation is $z_{t+1}=z_t^2+c$, where z and c are complex numbers;
  b) generating two chaotic iterates from said chaotic equation;
  c) converting the two chaotic iterates into a predetermined number of chaotic keys;
  d) encrypting a block of plaintext message as a block of ciphertext based on one of said chaotic keys;
  e) repeating step d) until a predetermined number of blocks of plaintext message have been encrypted with one each of said chaotic keys;
  f) repeating steps b) through e) until the entire plaintext message is encrypted as ciphertext.

2. The method of claim 1 wherein said predetermined number of chaotic keys in step c) is four and said predetermined number of blocks of plaintext message in step e) is four.

3. The method of claim 1 wherein each chaotic iterate is of length 2L, each chaotic key is of length L, each block of plaintext message is of length L, and each block of ciphertext is of length L.

4. The method of claim 3 wherein L=32 bits.

5. The method of claim 1 wherein the step of encrypting the plaintext message comprises combining each plaintext message block and each chaotic key by an exclusive-or operation.

6. The method of claim 1 further comprising the step of decrypting the ciphertext to the plaintext message based on the chaotic keys.

7. The method of claim 6 wherein the step of decrypting the ciphertext comprises combining the ciphertext blocks and said chaotic keys by an exclusive-or operation.

8. The method of claim 1 wherein, when the number of said chaotic iterates used to encrypt said message approaches n, two of said four initializer values are incremented at step a).

9. A method of encryption comprising the steps of;
  a) selecting four initializer values which are used to generate n chaotic iterates from a chaotic equation, where n is the lifetime of the chaotic equation, and wherein said chaotic equation is $z_{t+1}=z_t^2+c$, where z and c are complex numbers;
  b) generating two chaotic iterates, each of length L, from said chaotic equation;
  c) converting the two chaotic iterates into four chaotic keys of length L;
  d) separating each of said four chaotic keys into a first portion and a second portion;
  e) converting four blocks of plaintext message to four blocks of length 2L by multiplying each said block of length L of plaintext message by one of said first portions of each of said four chaotic keys;
  f) separating each block of said multiplied plaintext message of length 2L into two blocks of length L;
  g) encrypting four blocks of said multiplied plaintext message of length L as ciphertext based on said second portion of each of said four chaotic keys;
  h) combining the ciphertext into blocks of length 2L;
  i) repeating steps b) through h) until the entire plaintext message is encrypted as ciphertext.

10. The method of claim 9 wherein L=32 bits.

11. A method of encryption comprising the steps of;
  a) selecting four initializer values which are used to generate n chaotic iterates from a chaotic equation, where n is the lifetime of the chaotic equation, and wherein said chaotic equation is $z_{t+1}z_t^2+c$, where z and c are complex numbers;
  b) generating two chaotic iterates from said chaotic equation;
  c) converting the two chaotic iterates into four chaotic keys;
  d) separating each of said chaotic keys into a first portion and a second portion;
  e) converting four blocks of plaintext message into four blocks of multiplied plaintext message by multiplying each said block of plaintext message by said first portion of a specific chaotic key;
  f) repeat steps b) through e) which generate four new chaotic keys which are different than all previously generated chaotic keys, each said new chaotic key first portion is multiplied with one of said four blocks of plaintext message, said plaintext message being separate from all plaintext messages previously converted, and continue step f) until all of said plaintext message is converted to multiplied plaintext;
  g) separating each block of said multiplied plaintext message into two blocks;
  h) encrypting each separated block of said multiplied plaintext message with said second portion of a predetermined chaotic key to produce a block of ciphertext;
  i) combining consecutive blocks of ciphertext to produce an encrypted message;
  j) repeating steps h) and i) until all blocks of ciphertext have been converted into encrypted messages.

12. The method of claim 11 wherein the step h) includes repeating the steps of b) through d) to regenerate the chaotic keys which are separated to produce the second portion used for said encrypting.

13. The method of claim 11 wherein each chaotic iterate is of length 2L, each chaotic key is of length L, each block of plaintext message is of length L, each block of multiplied plaintext message is of length 2L, each block of separated plaintext message is of length L, and each block of ciphertext is of length 2L.

14. The method of claim 13 wherein L=32 bits.

15. The method of claim 11 wherein the step of encrypting the multiplied plaintext message comprises combining each multiplied plaintext message block and each said second portion of each said chaotic key by an exclusive-or operation.

16. The method of claim 11 further comprising the step of decrypting the encrypted message to the plaintext message based on the chaotic keys.

17. The method of claim 13 further including the step of decrypting the encrypted message which comprises the steps of;
  separating each ciphertext block of length 2L into two blocks of length L;
  combining said ciphertext blocks of length L and said second portion of said chaotic keys of length L by an exclusive-or operation;
  assembling the combined ciphertext and chaotic keys into blocks of length 2L;

dividing each block of length 2L by said first portion of one of said four chaotic keys to arrive at the plaintext message of length L;

repeating these steps until the entire ciphertext is decrypted to plaintext.

18. The method of claim 11 wherein, when the number of said chaotic iterates used to encrypt said message approaches n, two of said four initializer values are incremented at step a).

19. A method of encryption comprising the steps of;

a) selecting four initializer values which are used to generate n chaotic iterates from a chaotic equation, where n is the lifetime of the chaotic equation, and wherein said chaotic equation is $z_{i+1}=z_i^2+c$, where z and c are complex numbers;

b) generating chaotic iterates, each of length 2L, from said chaotic equation;

c) converting each chaotic iterate of length 2L into two chaotic keys of length L;

d) encrypting blocks of length L of plaintext message as ciphertext based on said chaotic keys; and e) repeating steps b) through d) until the entire plaintext message is encrypted as ciphertext.

20. The method of claim 19 wherein said step b) generates two chaotic iterates, and step c) four chaotic keys.

21. The method of claim 19 wherein L=32 bits.

22. The method of claim 19 wherein the step of encrypting the plaintext message comprises combining each plaintext message block of length L and one each of said four chaotic keys by an exclusive-or operation.

23. The method of claim 19 further comprising the step of decrypting the ciphertext back to plaintext based on the chaotic keys.

24. The method of claim 23 further comprising the step of decrypting the ciphertext comprising combining each ciphertext block of length L and one each of said four chaotic keys by an exclusive-or operation.

25. The method of claim 19 wherein step d) encrypts blocks of plaintext message of length L into ciphertext blocks of length 2L.

26. The method of claim 25 wherein the step of encrypting comprises;

1) separating each of said four chaotic keys into a first portion and a second portion;

2) converting four blocks of length L of plaintext message to four blocks of length 2L by multiplying each said block of length L of plaintext message by one of said first portions of each of said four chaotic keys;

3) separating each block of length 2L into two blocks of length L;

4) encrypting four blocks of length L as ciphertext based on said second portion of each of said four chaotic keys, by combining each plaintext message block and each said second portion of each said four chaotic keys by an exclusive-or operation;

5) combining the ciphertext into blocks of length 2L.

27. The method of claim 26 including the steps of decrypting the ciphertext comprising;

separating each ciphertext block of length 2L into two blocks of length L;

combining said ciphertext blocks of length L and said chaotic keys of length L by an exclusive-or operation;

assembling the combined ciphertext and chaotic keys into blocks of length 2L;

dividing each block of length 2L by said first portion of one of said four chaotic keys to arrive at the plaintext message.

28. A system for encryption comprising;

means for selecting four initializer values which are used to generate n chaotic iterates from a chaotic equation, where n is the lifetime of the chaotic equation, and wherein said chaotic equation is $z_{i+1}=z_i^2+c$, where z and c are complex numbers;

means for generating at least one chaotic iterate from said chaotic equation;

means for converting each of said at least one chaotic iterates into two chaotic keys;

means for encrypting at least one block of plaintext message as at least one block of ciphertext based on said chaotic keys.

29. The system of claim 28 wherein said at least one chaotic iterate is of length 2L, said chaotic keys are of length L, said at least one block of plaintext message is of length L, and said at least one block of ciphertext is of length L.

30. The system of claim 28 wherein two chaotic iterates and four chaotic keys are generated.

31. The system of claim 29 wherein L=32 bits.

32. The system of claim 28 wherein means for encrypting combines at least one of said blocks of plaintext message and at least one of said chaotic keys by an exclusive-or operation.

33. The system of claim 28 including means for decrypting said at least one block of ciphertext back to at least one block of plaintext based on said chaotic keys.

34. The system of claim 33 wherein means for decrypting the ciphertext combines each said at least one block of ciphertext and at least one of said chaotic keys by an exclusive-or operation.

35. The system of claim 30 wherein each of said plaintext message blocks is of length L and is encrypted as a ciphertext block of length 2L.

36. The system of claim 35 wherein said means for encrypting comprises;

means for separating each of said four chaotic keys into a first portion and a second portion;

means for converting four blocks of length L of plaintext message into four blocks of length 2L, said means comprising multiplying each said block of length L of plaintext message by one of said first portions of each of said four chaotic keys;

means for separating each block of length 2L into two blocks of length L;

means for encrypting four blocks of length L as ciphertext based on said second portion of each of said four chaotic keys, wherein each plaintext message block and each chaotic key is combined by an exclusive-or operation; and means for combining the ciphertext into blocks of length 2L.

37. The system of claim 35 including means for decrypting the ciphertext comprising;

means for separating each ciphertext block of length 2L into two blocks of length L;

means for combining said ciphertext blocks of length L and said chaotic keys by an exclusive-or operation;

means for assembling the combined ciphertext and chaotic keys into blocks of length 2L; and means for dividing each block of length 2L by said first portion of one of said four chaotic keys to arrive at the plaintext message.

* * * * *

UNITED STATES PATENT AND TRADEMARK OFFICE
CERTIFICATE OF CORRECTION

PATENT NO. : 5,751,811
DATED : May 12, 1998
INVENTOR(S) : Magnotti, et al.

Page 1 of 1

It is certified that error appears in the above-identified patent and that said Letters Patent is hereby corrected as shown below:

Title Page,
Item [57] Abstract: line 15, "where $N = 2r$ and $r \leq 2$", should read -- where $N = 2r$ --.

Column 2,
Line 50 reads "$X_{n+1} = x_n(1-x_n$"

Signed and Sealed this

Ninth Day of October, 2001

Attest:

*Nicholas P. Godici*

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO.    : 5,751,811
DATED         : May 12, 1998
INVENTOR(S)   : Magnotti, et al.

It is certified that error appears in the above-identified patent and that said Letters Patent is hereby corrected as shown below:

Title page, item [57],
Abstract,
Line 15, "where $N = 2_r$ and $r \leq 2$", should read -- where $N = 2^r$ --.

Column 2,
Line 50, delete "$X_{n+1} = \mu x_n(1-x_n)$" and insert -- $x_{n+1} = \mu x_n(1-x_n)$ --, (all x's in lower case).

Column 3,
Line 24, should contain all lower cases x's.
Lines 42, 43 and 49, should be all lower case p's.
Line 67, reads "1 s (a,b,q,p) $\leq$ 1" should be -- $-1 \leq (a, b, p, q,) \leq 1$ --.

Column 4,
Lines 19, 25 and 36, should all have lower case z's in place of capitals in the equations.

Column 5,
Line 33, should all have lower case z's in place of capitals in the equations.

Column 7,
Lines 31 and 32 reads "2196 and 232", should read -- $2^{196}$ and $2^{32}$ --.
Line 67, should contain lower case a's and b's instead of capitals in the equation.

Column 9,
Line 9, reads "$\log_2(2^{4 \times 104d}) = ...$", should read -- $\log_2(2^4 \times 10^{4d})$ --.

Column 10,
Line 25, all z's should be lower case in the equation.

Signed and Sealed this

Sixteenth Day of October, 2001

Attest:

*Nicholas P. Godici*

NICHOLAS P. GODICI
*Attesting Officer*    *Acting Director of the United States Patent and Trademark Office*